(12) United States Patent
Oswal et al.

(10) Patent No.: US 11,790,075 B1
(45) Date of Patent: Oct. 17, 2023

(54) MANAGED LIFECYCLE ROLES FOR SECURE CREDENTIAL VENDING

(71) Applicant: Amazon Technologies, Inc., Seattle, WA (US)

(72) Inventors: Varun Jayant Oswal, Seattle, WA (US); Liam Simon Hewitt, Seattle, WA (US); Rachit Jain, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 504 days.

(21) Appl. No.: 16/915,753

(22) Filed: Jun. 29, 2020

(51) Int. Cl.
*G06F 21/45* (2013.01)
*H04L 9/40* (2022.01)
*G06F 21/00* (2013.01)
*H04L 29/06* (2006.01)

(52) U.S. Cl.
CPC ................................. *G06F 21/45* (2013.01); *H04L 63/101* (2013.01)

(58) Field of Classification Search
CPC ........... G06F 21/45; G06F 21/30; G06F 21/31; G06F 21/604; G06F 21/62; H04L 63/101; H04L 63/108; H04L 63/10
See application file for complete search history.

(56) References Cited

U.S. PATENT DOCUMENTS

| 8,065,712 | B1 | 11/2011 | Cheng et al. | |
| 9,112,782 | B2 | 8/2015 | Siddiqui et al. | |
| 2010/0306268 | A1* | 12/2010 | Bhatti et al. | G06F 16/176 707/738 |
| 2021/0329003 | A1* | 10/2021 | Segal et al. | H04L 63/08 |

FOREIGN PATENT DOCUMENTS

WO     2016178951     11/2016

* cited by examiner

*Primary Examiner* — Edward Zee
(74) *Attorney, Agent, or Firm* — Robert C. Kowert; Kowert, Hood, Munyon, Rankin & Goetzel, P.C.

(57) ABSTRACT

Managed lifecycle roles are disclosed. Managed lifecycle roles may be used for secure credential vending or otherwise. For instance, an entity (e.g., administrator or other entity) requests, via an interface of a role manager, creation of a role associated with a lifecycle definition (e.g., an expression of an enforceable expiration of the role or similar characteristic). The role manager stores the role and role lifecycle definition to a data store. Another entity requests to use the role to perform some operation with respect to a resource. A credential service validates the request against a lifecycle definition for the role (and against an access control list, in some examples) and responds to valid requests with credentials useable to perform the operation with respect to the resource. The other entity uses the credentials to perform the operation with respect to the resource. A sweep process manages attributes of the roles.

20 Claims, 10 Drawing Sheets

| Role Definition Table For Account B | | | |
| Role Definition Table For Account A | | | |
| Role Name | Permission(s) | Lifecycle Definition | Lifecycle Tags |
|---|---|---|---|
| VisitorA | Read-DataStoreA | 1 day | Active |
| EngineerB | Full-InstanceA/DataStoreB | 1 mo. resettable, M-F, 9-5 | Inactive |
| EngineerA | Full-Instance/DataStoreA | | Blue |
| SvcXRequest | Requests/ServiceX | | |
| Admin | Full-All | 2 mo. resettable | |
| SvcBCreate | CreateObject/ServiceB | 1 day | Expired |
| SalesA | Read/Write-DataStoreA | 6 mo./Badge | Active |

Role Definition Table For Account B
Role Definition Table For Account A

| Role Name | Permission(s) | Lifecycle Definition | Lifecycle Tags |
|---|---|---|---|
| VisitorA | Read-DataStoreA | 1 day | Active |
| EngineerB | Full-InstanceA/DataStoreB | 1 mo. resettable, M-F, 9-5 | Inactive |
| EngineerA | Full-Instance/DataStoreA | | Blue |
| SvcXRequest | Requests/ServiceX | | |
| Admin | Full-All | 2 mo. resettable | Expired |
| SvcBCreate | CreateObject/ServiceB | 1 day | |
| SalesA | Read/Write-DataStoreA | 6 mo./Badge | Active |

*FIG. 2A*

Access Control List For Account B
Access Control List For Account A

| Role Name | Entity ID |
|---|---|
| Admin | Admin99 |
| EngineerA | swengr14 |
| | swengr43 |
| EngineerB | swengr14 |
| | swengr91 |
| SvcBCreate | XT191W |
| | CT667Z |
| SvcXRequest | 14DRTBY |

MANAGED LIFECYCLE ROLES FOR SECURE CREDENTIAL VENDING

BACKGROUND

In the computing world, there is a great pressure to secure information and resources. Limited time credentials generated by delegation of authorization has helped, however these features have some shortcomings for the most security conscience users.

In recent years an ever-increasing number of applications and services have begun using entities to authorize the delegation of resources during account access. This delegation may happen through an administrator either programmatically or automatically through software creating a profile with certain authorizations to such resources and in turn issuing time constrained credentials to various other principals they deem required to access these resources. This has worked well for many years, however there are security concerns left unaddressed with the current implementation at large. A few non-exhaustive examples of security concerns are that a role may be left to exist even after the role's usefulness has expired, some roles may exist forever, and some existing roles serve no purpose.

BRIEF DESCRIPTION OF DRAWINGS

FIGS. 2A-2B illustrate tables of data for use in a system that implements managed lifecycle roles for secure credential vending, according to at least some embodiments.

Figure 1:
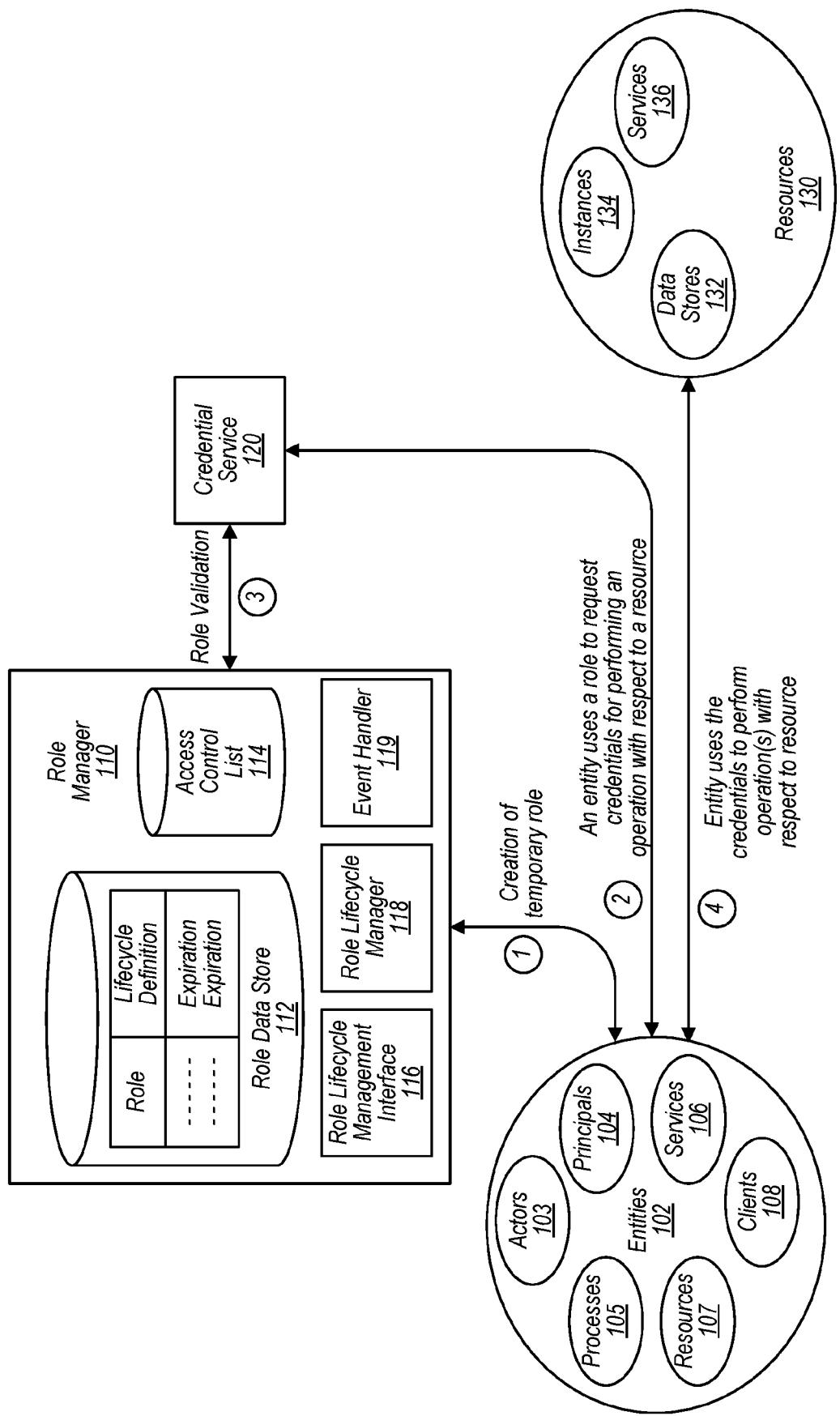
FIG. 1 is a block diagram of an architecture for a system that implements managed lifecycle roles for secure credential vending, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and systems implement managed lifecycle roles for secure credential vending. Although it is contemplated that managed lifecycle roles may be implemented for other uses as well, some embodiments herein describe managed lifecycle roles for secure credential vending, in particular.

For instance, in some embodiments, managed lifecycle roles may be created for secure vending of credentials useable to perform various operations with regard to various system resources. For example, an administrator, either programmatically or automatically through software, may create a managed lifecycle role with certain authorizations to resources, and a credential service may in turn issue time constrained credentials to an entity that is authorized to use the role (the credentials may provide permissions for entities, such as an application to access other resources). Examples include an administrator (or other entity or role) making key-value-based object storage and database tables available to various other principals they deem required to access these resources. Roles may have certain properties such as trust policies, permission policies and session durations, or the like. Roles may have key-value based tags (e.g., team green, team blue or the like, etc.) in embodiments.

The key-value based tags on the roles, trust policies, permission policies, access control lists and/or session durations may be subject to the automated and/or event-based lifecycle management techniques described herein, in embodiments. In embodiments, the lifecycle definition can affect aspects of the role other than just expiration, such as permission attributes, access control list (ACL) attributes, or other attributes of the role. The lifecycle definition might specify that a state of any of these attributes is to change over time or in response to event(s), thus making the role dynamic (as opposed to static).

In embodiments, managed lifecycle roles (e.g., sometimes referred to as "ephemeral" or "temporary" roles) are roles that have a managed lifecycle. A managed lifecycle role having a managed lifecycle has a role existence duration that determines the time the role exists or is active, in embodiments. After being used for a certain length of time that has transpired, the managed lifecycle role may be marked as expired, or deleted. An example benefit is mitigation of roles accumulating by being left over after the role's usefulness has passed. For example, Customer 1 creates, via a role lifecycle manager interface, a role in their account for use by Service A. As part of creating the role, Customer 1 sets, via the interface, an expiration date on the existence of the role to five days. Service A then generates temporary credentials using the role which grants a user, taking on the role with the credentials, access to some other resource in Customer 1's account. Service A performs the operations on this resource, completing the work in 2 hours. Customer 1 forgets about this role since they are working on other projects. The role gets automatically deleted after 5 days since that was the expiration date. In this case, Customer 1 does not need to worry about the role being used again after 5 days. They also do not have to run audits on their account for old roles if they are setting expiration dates on them. This new functionality also mitigates the second scenario of roles existing forever, in embodiments.

The issue of roles existing when they serve no purpose can be mitigated through the creation of roles that exist only during certain time periods or under certain conditions. For example: Customer 1 hires Contractor 1. Contractor 1 works from 9am to 5pm Monday-Friday. Customer 1 creates a role for Contractor 1 to generate the credentials needed for their job. Customer 1 adds a time-based existence clause to the role, indicating in the role definition that it should not exist except for the times that Contractor 1 is hired to work. In this case, Customer 1 does not have to worry about Contractor 1 using this role outside of work hours.

In another example with the same two actors: Customer 1 creates a role for Contractor 1 to use 2. Customer 1 adds new conditionals for this role to exist, for example they add the condition that this role should only exist after Contractor 1 has badged into the office and the role should not exist (or remain active, in embodiments) when Contractor 1 has badged out of the office. In this case, Customer 1 does not have to worry about Contractor 1 using this role when not in the office. There are many other conditional checks that are contemplated without departing from the scope of the disclosure (e.g., time-based and non-time-based conditional checks).

Identity Service

Generally, an identity service may control access to system resources. In some embodiments, when a principal makes a request, enforcement code may check whether the principal is authenticated (signed in) and authorized (has permissions). Access to resources may be managed by creating policies and attaching them to identities or resources. Policies (e.g., JSON documents) when attached to an identity or resource, may define the permissions associated with the identities or resources. Enforcement code may use values from the request context to check for matching policies and determine whether to allow or deny the request.

In embodiments, a request context may include any or all of the following information: The actions or operations that the principal wants to perform- may be an action in a management console, or an operation in the CLI or API. Resources - a resource object upon which the actions or operations are performed. Principal — The person or application that used an entity (user or role) to send the request. Information about the principal includes the policies that are associated with the entity that the principal used to sign in, in embodiments. Environment data — Information about the IP address, user agent, SSL enabled status, or the time of day. Resource data — Data related to the resource that is being requested. This can include information such as a table name or a tag on an instance.

Entities

As used herein, a system may include various actors (sometimes referred to as entities) and/or principals (e.g., individual people, process(es), service(s), resources(s) such as compute instances, automated systems, or the like). In embodiments, a principal is a person or application, etc. that used an entity (e.g., a user or role) to send a request. Information about the principal includes the policies that are associated with the entity that the principal used to sign in, in some embodiments.

Identity

Generally, in embodiments, all identities in a given namespace are unique. Identities can have multiple attributes. An entity may have multiple identities. Identity is associated with authentication, in embodiments. In some embodiments, identities represent a user, and can be authenticated and then authorized to perform actions in an application or system. Identities and groups (e.g. a collection of users) can be associated with one or more policies to determine what actions a user, role, or member of a group can do with which resources and under what conditions, in some embodiments. Identities may have multiple attributes.

Users

Users generally assume a digital identity (across applications, in embodiments). In some embodiments, a user is an identity with specific permissions in an account. In some systems, it may not be necessary to create a user for every occasion on which credentials are needed. In some cases, roles and temporary security credentials may be used instead of using the long-term credentials associated with a more traditional user.

Roles (Assumable By, or Assigned to a User, Application or Other Principal, for Example)

In embodiments, roles are groups of operations and/or other roles. Users are granted roles related to a particular job or job function, for example. In some embodiments, roles are granted authorizations, effectively authorizing all users which have been granted the role. For example, a user administrator role might be authorized to reset a user's password, while a system administrator role might have the ability to assign a user to a specific server.

In embodiments, a role is an entry in a data store (e.g., a database or otherwise) associated with permissions (e.g., via a permission policy or otherwise) that determine what an identity that has assumed the role can and cannot do in the system. In some embodiments, a role does not necessarily have any permanent credentials (password or access keys) associated with it. In embodiments, a role does not have a permanent identity associated with it. A role may be a template of permissions, for example. The role may be associated with a permission to generate or obtain credentials (e.g., temporary credentials). For example, instead of being uniquely associated with one person, a role may be intended to be assumable by anyone (e.g., assumable by an identity of an actor or entity, user, application or other principal) or by an entity (e.g., an application, service, instance, process, resource, etc.) that needs it. For instance, a user or application can assume a role to temporarily take on different permissions for a specific task. In embodiments, as long as an actor/user/principal is listed in a trust policy associated with a role (e.g., an access control list or other access control mechanism) that actor may be able to assume that role and obtain the corresponding credentials that unlock the permitted actions or behaviors.

In embodiments, a role can be assigned to a federated user who signs in by using an external identity provider instead of an external identity service. In embodiments, the system uses details passed by the identity provider to determine which role is mapped to the federated user, for example. In some embodiments, a credential service may provide an entity that has assumed or been assigned a role temporary credentials to be used to act on the permissions associated with the role (e.g., to be used to sign API requests when acting within the permissions of that role, or otherwise).

Roles may be used to delegate access to users, applications (e.g., a web service or the like), or services that don't normally have access to various resources. For example, it may be desirable to grant users in your account access to resources they don't usually have, or grant users in one account access to resources in another account. Or you might want to allow a mobile app to use various resources, but not want to embed the corresponding keys within the app (where they can be difficult to rotate and where users can potentially extract them). Sometimes it may be desirable to give access to users who already have identities defined outside of the system, such as in your corporate directory. Or, you might want to grant access to your account to third parties so that they can perform an audit on your resources. For these scenarios, roles provide the ability to delegate access to various resources.

In embodiments, a service role is a role that a service assumes to perform actions in your account on your behalf. Service roles vary from service to service, but many allow selection of permissions, as long as you meet the documented requirements for that service. Service roles provide access only within your account and cannot be used to grant access to services in other accounts. You can create, modify, and delete a service role, in embodiments.

Some systems may implement restrictions on the number of roles per account. In embodiments, a system that implements temporary roles (e.g., where the roles have a lifetime that expires) may not need to implement such restrictions, the number of allowable roles may be unlimited. Contemplated are hybrid systems with both temporary and non-temporary roles, where non-temporary roles are restricted to some maximum number of roles while temporary roles are allowed in unlimited quantity.

Enforcement of Lifecycle of Roles

A system's enforcement of lifecycle roles may include any combination of a number of different techniques, batch or event-oriented, for example, that enforce a lifecycle definition for roles. For instance, a batch-type role lifecycle implementation may include processing a batch of roles in the system. A system that batch processes the lifecycle of roles may perform various types of checks (e.g., time-based event checks, non-time-based event checks) as well as other role lifecycle management processes (e.g., create, delete, activate, deactivate). The batch processing may be performed periodically, or based on some trigger or based on some administrator-configurable feature, etc. Role lifecycle enforcement for any particular role may be triggered by an event, such as a request to exercise the role, in embodiments. Role lifecycle enforcement may include enforcement of any of a number of features including, but not limited to: creation of a role, reading data about the role, updating the role, and deletion of the role. For example, creation of temporary roles may be unlimited in quantity, temporary roles may have a maximum lifetime, and roles may be activated and deactivated (e.g., instead of deleted and re-created).

Credentials

In embodiments, temporary credentials are primarily used with (non-temporary) roles, but there may be other uses. The system may make available or implement temporary credentials that have a more restricted set of permissions than a standard identity service user. Such mechanisms may prevent accidental performance of tasks that are not permitted by the more restricted credentials. An example benefit of some types of temporary credentials is that they expire automatically after a set period of time. The duration that the credentials are valid may be configurable, in embodiments. Temporary credentials are not to be confused with temporary roles. In the former, the credentials associated with a role are temporary, but the role itself is not temporary. It is unexpected for a system to implement temporary roles as temporary credentials provide advantages of not having to distribute or embed long-term security credentials with an application. Other advantages of temporary credentials may include providing access to resources to users without having to define an identity for them, and/or temporary credentials may form the basis for roles and identity federation. Thus, temporary credentials provide many advantages. A problem with temporary credentials is that while temporary credentials expire, there are generally few restrictions on renewing or otherwise receiving new credentials, using the same role (e.g., as long as an actor is still on an access list for a role associated with temporary credentials, those credentials may be re-obtained, even after they expire). In some such systems, unintentional inclusion on access lists associated with non-temporary roles may lead to unintentional dissemination of the corresponding credentials and unintentional access. Managing a lifetime of roles (e.g., temporary roles), as described herein, may prevent such unintentional access.

Types of Policies

A trust policy, associated with a role, may define the principals that are trusted to assume the role, in embodiments. A role trust policy is a required resource-based policy that is attached to a role, in embodiments. The principals that may be specified in the trust policy include users, roles, accounts, and services, for example. A permissions policy may be a permissions document that defines what actions and resources the role can use.

FIGS. 1-8 illustrate examples of system architectures, data, and processes that may be performed to implement managed lifecycle roles for secure credential vending, in various embodiments. Various of the illustrated components in the system architectures illustrated in FIGS. 1 and 7 may perform various of the functionality illustrated in flow diagrams of FIGS. 3-6, using the data illustrated in FIGS. 2A-2B. For example, the role manager 110 in FIGS. 1 and 7 (illustrated alternatively as a service or component) may perform the request processing depicted in FIGS. 3-6, in association with the example data illustrated in in FIGS. 2A-2B.

Figure 7:
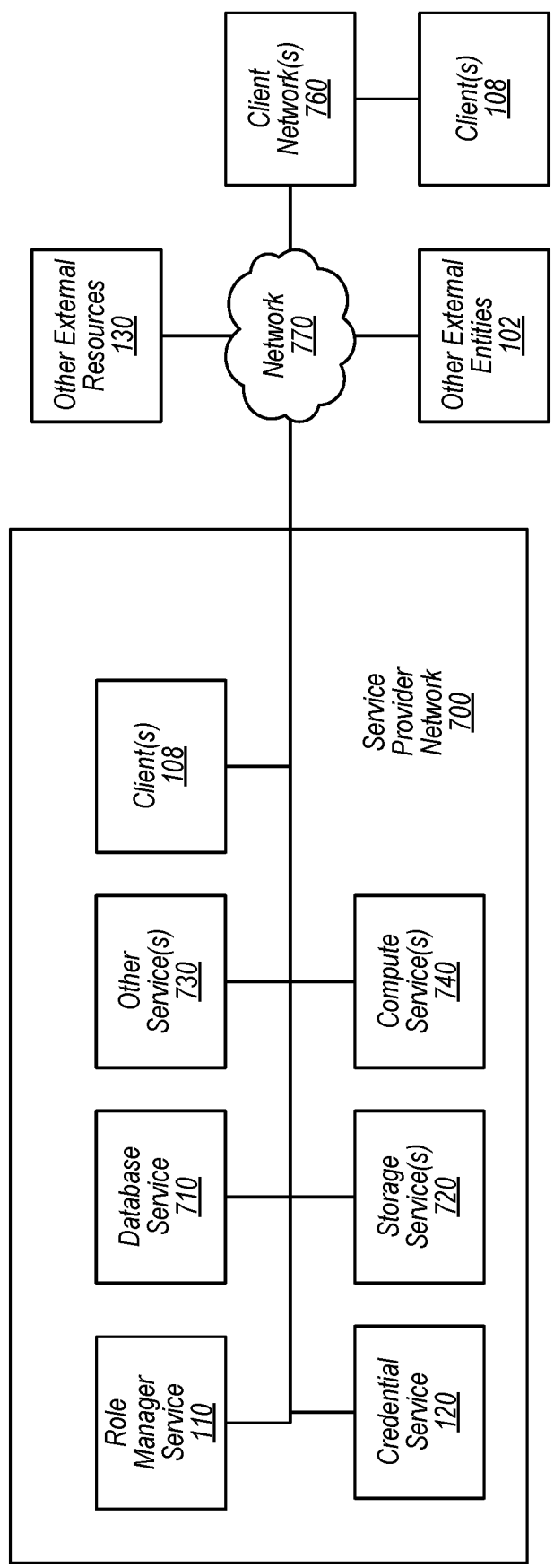
FIG. 7 is a system architecture for a service provider network that implements managed lifecycle roles for secure credential vending, in at least some embodiments.

FIG. 1 is a block diagram of an architecture for a system that implements managed lifecycle roles for secure credential vending, according to at least some embodiments. FIG. 1 generally illustrates entities 102 that may interact with role manager 110 and credential service 120 in order to perform operations with respect to resources 130. Entities 102 and resources are intended to be construed broadly. Numerous examples of entities are provided as some of the terms are not necessarily used consistently across various existing systems, while some terms are. Some terms may have overlapping meanings, or be subsets of other terms, for example. The illustrated non-exhaustive list of example entities 102 includes actors 103, principals 104, processes 105, services 106, resources 107, clients 108. The illustrated groupings are not necessarily mutually-exclusive, but are meant to illustrate the intentionally broad and inclusive intended meaning of the terms "entity" and "resource." For example, entities 102 and resources 130 in FIG. 7 are a similar illustration of the intentionally broad and (non-exhaustive) intended scope of the terms in a particular context. It is intended that any entity capable of performing the described processes attributed to the entity 102 be included in the meaning of entity, in various embodiments. Similarly, it is intended that any resource of a system that is associated with an operation be included in the meaning of resource, in various embodiments.

Role manager 110 is illustrated with role lifecycle manager 118. Role lifecycle manager 118 may perform various functionality associated with management of the lifecycle of a lifecycle managed role. For example, lifecycle manager 118 may manage expirations of the roles, and/or other data within the role definition, such as tags, permissions, and access control lists or the like. Roles that have attributes managed by the role lifecycle manager 118 may be referred to as managed roles, in embodiments. In some instances, the role lifecycle manager 118 may, based on attributes of the lifecycle definition, manage the attributes of a managed role, such as permission attributes, ACL attributes, or other attributes of the role. In embodiments, a role manager may manage roles according to respective role lifecycle definitions stored in data store 112. In embodiments, to manage the roles according to the role lifecycle definitions, the role manager may change, over time and based on the role lifecycle definitions, the state of role access information or the state of one or more role attributes for at least some of the roles.

Generally, one or more components of role manager 110 may process various type of requests (illustrated in FIGS. 3A, 3B and 3C, 4) received via role lifecycle management interface 116 in association with data illustrated in FIGS. 2A-2B. In the illustrated example of FIG. 1, at ("1") an entity, such as an administrator or some other authorized role creation entity makes a request via role lifecycle management interface 116 of role manager 110 to create a managed lifecycle role. In response, the role lifecycle manager 118 may create the role by storing role information a data store 112 (block 314). The stored role information for managed lifecycle roles includes a lifecycle definition (e.g., some indication of an expiration for the role, or an active duration, or an event-based lifecycle definition, etc.). In embodiments, the role information for non-managed lifecycle roles (e.g., sometimes referred to as "static" roles, herein) does not include a lifecycle definition.

Event definition information may be created and stored as part of the role creation. Event definition information may be stored in the role definitions in the role data store, or external to the role manager, in embodiments. In embodiments event listeners may be registered and event handler 119 may process the events according the event definition information (e.g., where to subscribe to event, what the event is, what the event causes to happen) that is registered with the event handler 119. The events may be internal-to-the-role-manager events or external events. For example, an event may include updating permissions to upgraded resources in two months when a project goes to next design level, or a badge-based event, etc.

In some embodiments, authorization for an entity to use a role (managed lifecycle or static) may be indicated and stored at this point, via the role lifecycle management interface 116, for example. In some embodiments, such authorizations are set via an alternative interface, such as a role authorization interface (not illustrated). Authorizations may be stored in an access control list (illustrated in FIG. 2B) for example.

At ("2") an entity 102 uses one of the created roles to request, from a credential service 120, credentials for performing an operation with respect to a resource. At ("3") credential service 120 checks with the role lifecycle manager 118 of the role manager 110 to validate the role (e.g., determine that the role exists, has not expired, and/or that the entity is on the access control list for that role). For a validated role, the credential service generates and provides credentials (e.g., a key or the like) back to the entity 102. In some embodiments, the response may include corresponding permissions for the target resource. In some embodiments, the permissions may have been cached by the role manager 110 and provided to the entity. At ("4") the entity uses the credentials to perform one or more operations with respect to the target resource 130. A resource 130 that receives the request from the entity to perform the operations may validate the credentials with credential service 120, in some embodiments.

FIGS. 2A-2B illustrate tables of data for use in a system that implements managed lifecycle roles for secure credential vending, according to at least some embodiments. Similar data may be stored in other forms, without departing from the scope of the disclosure. FIG. 2A illustrates tables of role definition for different accounts (or for different customers or clients, or the like, etc.) that may be stored in role data store 112 and FIG. 2B illustrates access control list tables that lists authorized entity identifiers (IDs) for corresponding roles having unique names. In some embodiments, the entity IDs may be identifiers of resources such as compute instances or processes of a computer network. In embodiments, the role data store 112 and/or the access control list 114 may be implemented in local-to-the-role-manager storage, as a table in a database service, in a key-value data store, or in an object data store, as non-exhaustive examples (stored together or separately).

FIG. 2A illustrates the role definition for static roles (e.g., EngineerA, SvcXRequest) does not include a lifecycle definition, but role information for a managed lifecycle role (sometimes referred to as an expiring or temporary role) does include a lifecycle definition (e.g., VisitorA, EngineerB, Admin, SvcBCreate, SalesA). Various non-exhaustive examples of permissions are provided. Generally, any operation that can be associated with a resource may be controlled or specified via a permission. Permissions are intended to be construed broadly and may be specified via various permission policies, in embodiments. Particular permission policies may be generated based on generalized permission templates, in embodiments.

In FIG. 2A, M-F, 9-5 shown as an example of part of the lifecycle definition. The corresponding tag (e.g., illustrated as "active") could toggle between active and inactive depending on what day it is and the current time.

Role Lifecycle Definitions

Various non-exhaustive examples of lifecycle definitions are provided. A lifecycle definition may include an expiration date and time, or a period of time for which the role is active or not expired, for example. In some embodiments, each managed lifecycle role for an account or system may be restricted by a maximum role lifetime expiration that specifies a maximum duration for existence of the role. The maximum role lifetime expiration may be configurable and/or may be a default attribute of a role.

A lifecycle definition may define a resettable expiration, in embodiments. For example, a resettable expiration may specify expiration of a role after some configurable amount of time (e.g., for non-use). In some embodiments, the amount of time to expiration may be reset to the configurable value each time the role is used. For example, each time credential service 120 requests validation of the role may cause the role lifecycle manager 118 to reset the resettable expiration for the role to the configurable value and the role lifecycle manager 118 may countdown to the value and expire the role if it is not used again.

Lifecycle definitions may specify other time-based events. For example, in some embodiments, a lifecycle definition for a role may specify that a role is created, or transitioned from inactive to active, for a particular duration (e.g., Monday - Friday, 9 A.M.-5 P.M.). Such a definition may indicate that the role is to be created and deleted accordingly, or to transition between active and inactive, for the indicated hours. Lifecycle definitions may specify non-time-based events. FIG. 2A illustrates a 6 mo./Badge lifecycle definition for role unique name SalesA. Such a definition may indicate that the role is associated with a maximum lifetime of 6 months and that the role is also to be created or to transition between active and inactive based on whether a badge reader has indicated the user is in the building or has left. In some embodiments, the role may be deleted each day at 5 P.M.

Lifecycle definitions may be specified in a lifecycle definition policy, in embodiments. Particular lifecycle definition policies may be generated based on generalized lifecycle definition templates, in embodiments.

Any of various lifecycle tags may be stored as part of a role definition in role data store 112. Various non-exhaustive examples of lifecycle tags are provided. For example, if a sweep process (e.g., illustrated in FIG. 5, described below) determines that a role has expired or is to be activated/deactivated, such a characteristic may be indicated in a tag. Other information may be stored as tags, such as conditions for permissions. Tags may be generated, modified and deleted as part of any of the processes illustrated in FIGS. 3A, 3B, 3C, 4, 5, 6.

Various non-exhaustive examples of groupings of entity IDs associated with respective unique role names are illustrated in FIG. 2B. IDs may be added or removed from association with a particular unique role, via lifecycle management interface 116 or via some other interface, such as an authorization interface (not illustrated) in embodiments.

Figure 3A:
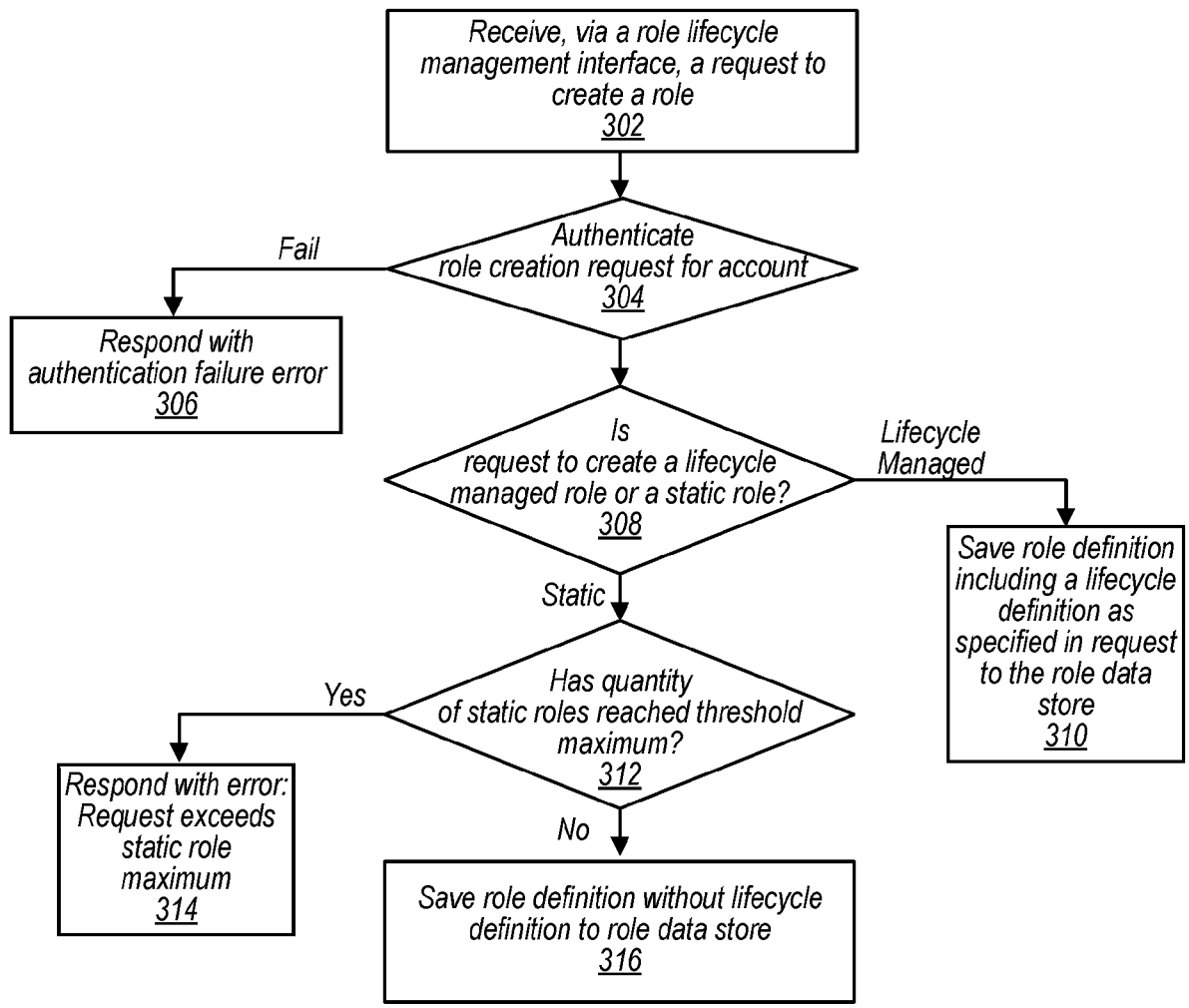
FIG. 3A is a process flow diagram for processing role creation requests received via an interface of a system that implements managed lifecycle roles for secure credential vending, according to at least some embodiments.

FIG. 3A is a process flow diagram for processing role creation requests received via an interface of a system that implements managed lifecycle roles for secure credential vending, according to at least some embodiments. The illustrated functionality may be performed by components of a role manager 110, in embodiments. At block 302, a request to create a role is received, via a role lifecycle manager interface 116. The role creation request is authenticated for the account (block 304). For example, the role manager 110 may use the ID in the request to identify the associated account or customer in order to identify whether the ID in the request is associated with role creation privileges. If authentication fails, the role manager 110 may respond with an authentication failure error (block 306).

At block 308, the role manager may determine whether the request is to create a lifecycle managed role or a static role. If the request is for a life-cycle managed role, a role definition, including a role lifecycle definition as specified in the request is saved to the role data store 112 (block 310). A default lifecycle definition may be specified/enforced, or a custom lifecycle definition may be specified, via the role lifecycle management interface 116, for example. Lifecycle definitions may be specified based on lifecycle definition templates, in embodiments. Events may be defined (e.g., via the role lifecycle management interface 116, or otherwise) and stored (e.g., event definitions may be stored in role data store 112, or elsewhere). Event registration may be performed at this point, or at some other point in the described sequences, or otherwise, in embodiments.

If the request is to create a static role, the role lifecycle manager may determine whether the quantity of static roles has reached a maximum threshold (block 312). If so, the role manager may respond with an error: request exceeds static role maximum (block 314). In some embodiments, the role manager may determine whether the quantity of both static roles and lifecycle managed roles has reached a maximum threshold and may respond to reaching the maximum quantity of total roles by looking for lifecycle managed roles to expire to make room (e.g., by running the sweep process illustrated in FIG. 5 described below, for example or by examining tags to identify roles to expire, etc.). If the maximum threshold quantity of static roles has not been reached, the role definition for the static role is stored, without the lifecycle definition, to the role data store 112 (block 316). In some embodiments, the system may not perform the check for the maximum quantity of roles.

Figure 3B:
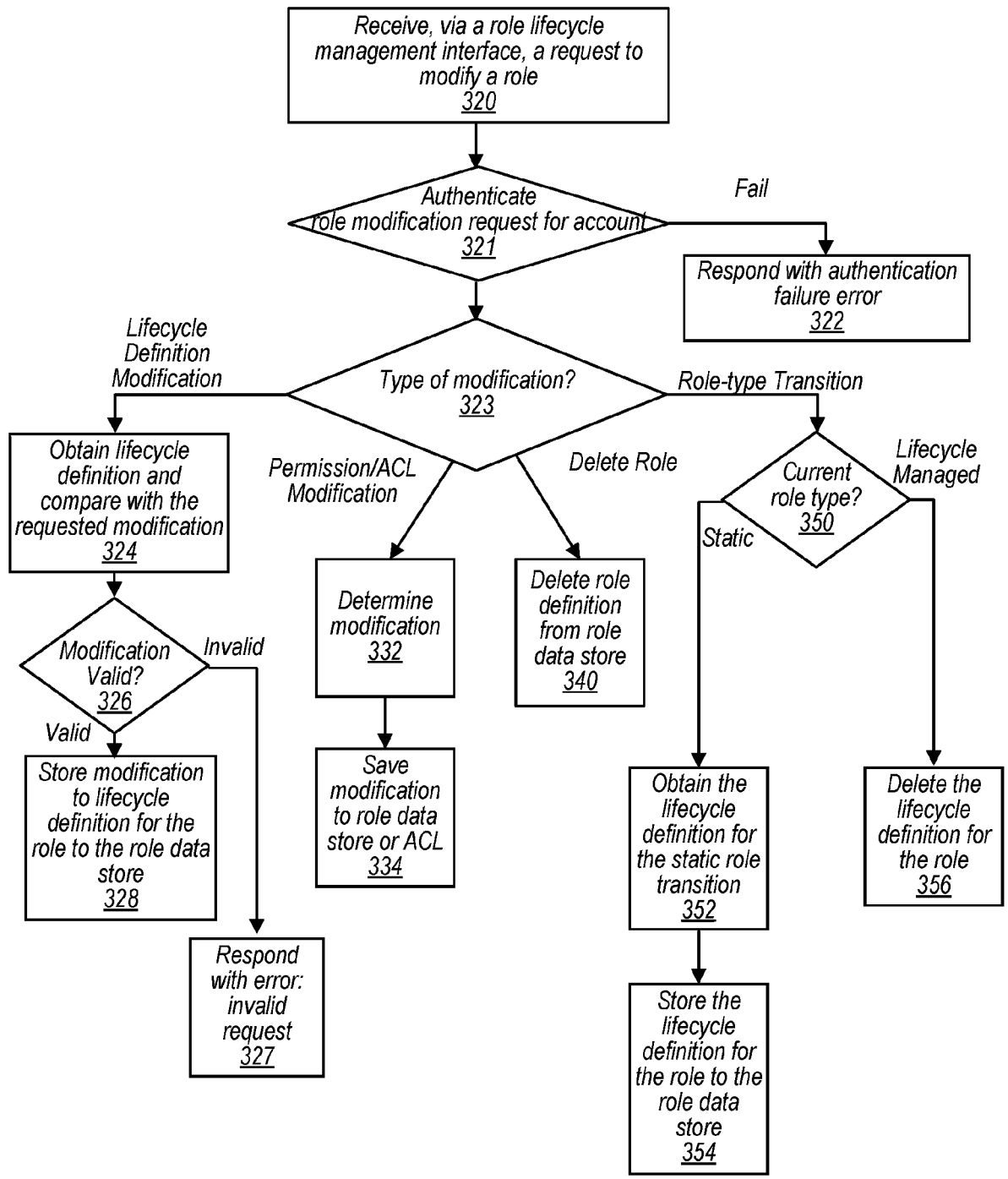
FIG. 3B is a process flow diagram for processing role modification requests received via an interface of a system that implements managed lifecycle roles for secure credential vending, according to at least some embodiments.
Figure 5:
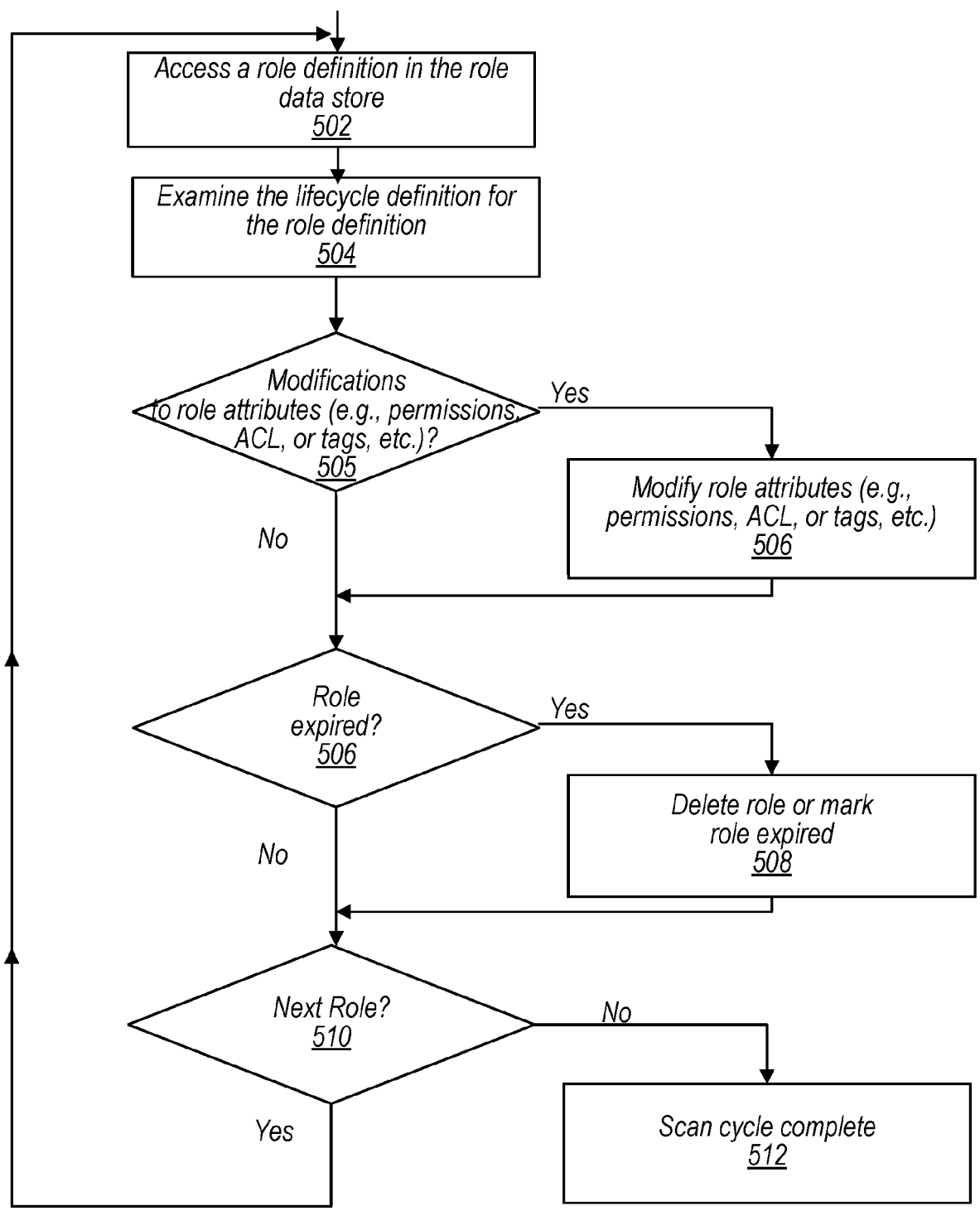
FIG. 5 is a process flow diagram for a role lifecycle sweep process in a system that implements managed lifecycle roles for secure credential vending, according to at least some embodiments.

FIG. 3B is a process flow diagram for processing role modification requests received via an interface of a system that implements managed lifecycle roles for secure credential vending, according to at least some embodiments. The requests may be directed to roles that were created via the role creation process illustrated in FIG. 3A, described above, for example. In some embodiments, at least some of the modifications illustrated in FIG. 3B, described below, may be performed in an automated fashion, by role lifecycle manager 118, based on the lifecycle definition, for example. FIG. 5, described below, illustrates some examples of features that may be automatically managed, such as the state of one or more role attributes (e.g., permission attributes, access control list attributes, or tag attributes, etc.).

The illustrated embodiment is broken up into four types of example modifications (lifecycle definition modifications, permission/access control list modifications, deletions, and role-type transitions). More or fewer types of modifications may be implemented in various embodiments.

At block 320, a request to modify a role is received via a role lifecycle management interface 116. The role modification request is authenticated for an account (block 321). For example, the role manager may determine from an identifier associated with the request, the account for the modification, and whether the identity associated with the request has permission to perform the modification. If the authentication fails, the role manager 110 may respond with an authentication failure error (block 322). Otherwise, the role manager may determine the type of modification (block 323). For example, the request may indicate the type of modification. For a lifecycle definition modification, the role manager 110 may obtain a lifecycle definition (e.g., from the role data store) and compare it with the requested modification to determine if the modification is valid (block 326). If the modification request is invalid (block 326, invalid) the role manager 110 may respond with an error: invalid request (block 327). Otherwise, for a valid modification request (block 326, valid) the role manager may store the modification to the lifecycle definition for the role to the role data store (block 328).

Back at block 323, the role lifecycle manager 118 may determine (based on the request) that the type of requested modification is a modification to one or more permissions or to an access control list. The particular modification is determined (block 332) and the modification is saved to the role data store or access control list, as appropriate (block 334). In at least some embodiments, the role lifecycle manager 118 may obtain a role definition and compare it with the modification to determine of the modification is valid (not illustrated), responding with an invalid request error for invalid modifications to the permissions or access control list (ACL).

Back at block 323, the role lifecycle manager 118 may determine (based on the request) that the type of requested modification is a request to delete a role. The request may be to delete either of a static role or delete a lifecycle managed role, in embodiments. The role lifecycle manager 118 may delete the role definition from the role data store 112. In some embodiments, the role lifecycle manager 118 may mark the role as expired or inactive.

Back at block 323, the role lifecycle manager 118 may determine (based on the request) that the type of requested modification is transition a role type (e.g., from static to lifecycle managed, or vice versa). The role manager may determine the existing role type (block 350), determine whether the transition request is valid (not illustrated) and for a request to transition a lifecycle managed role to a static role, delete the lifecycle definition for the role (block 356).

For a request to transition a static role to a lifecycle managed role, the role lifecycle manager 118 may obtain the lifecycle definition for the role (e.g., from the request) (block 352) and save the lifecycle definition for the role to the role data store (block 354).

Figure 3C:
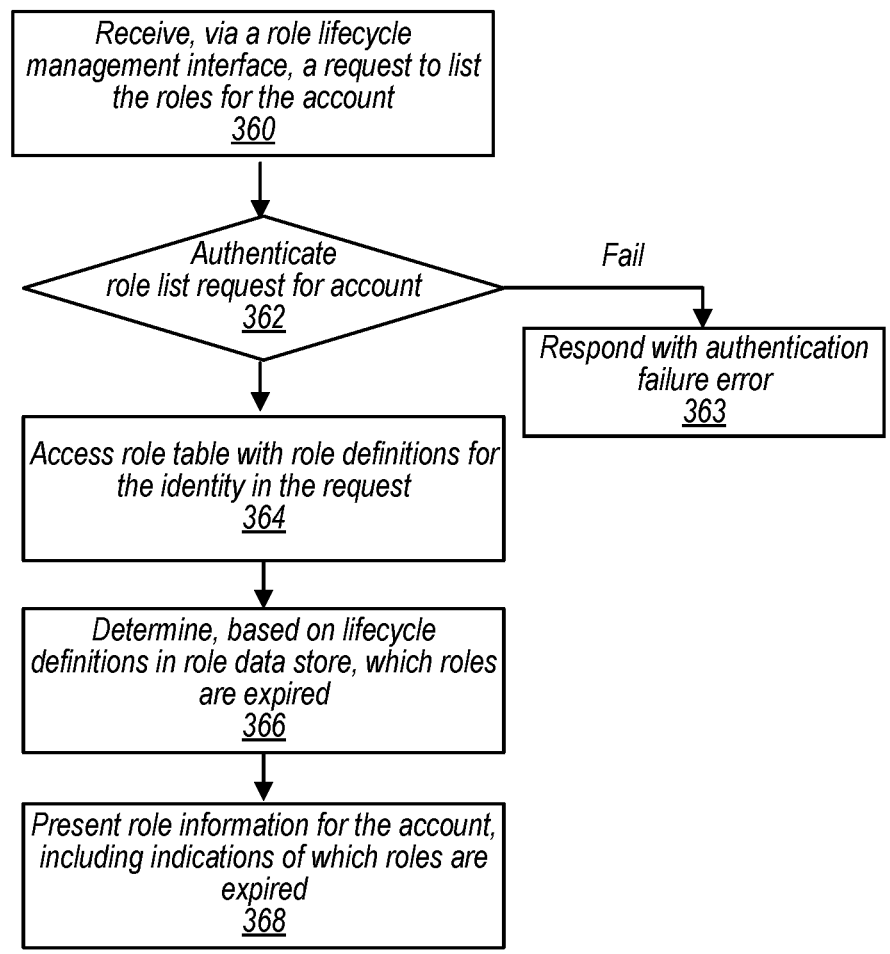
FIG. 3C is a process flow diagram for processing role display requests received via an interface of a system that implements managed lifecycle roles for secure credential vending, according to at least some embodiments.

FIG. 3C is a process flow diagram for processing role display requests received via an interface of a system that implements managed lifecycle roles for secure credential vending, according to at least some embodiments. The roles displayed may be the roles created in FIG. 3A and modified in FIG. 3B, in embodiments. The illustrated process may be performed by one or more components of the role manager 110, in embodiments.

At block 360, a request to list the roles for the account is received via a role lifecycle management interface 116. The role list request is authenticated for the account (block 362). For instance, the role manager 110 may determine whether an identity associated with the request is authorized to making role list requests, based on permissions or the like, etc. If the authentication fails, the role manager 110 may respond with an authentication failure error (block 363).

At block 364, the role manager 110 may access the role table with the role definitions for the requesting identity (e.g., in the role data store 112) and determine, based on lifecycle definitions in the role data store 112, which roles are expired (block 366). The role manager 110 may present role information for the account, including indications of which roles are expired (block 368). For example, expired roles may be graphically greyed out or graphically struck through or the like, to indicate their expiration.

Figure 4:
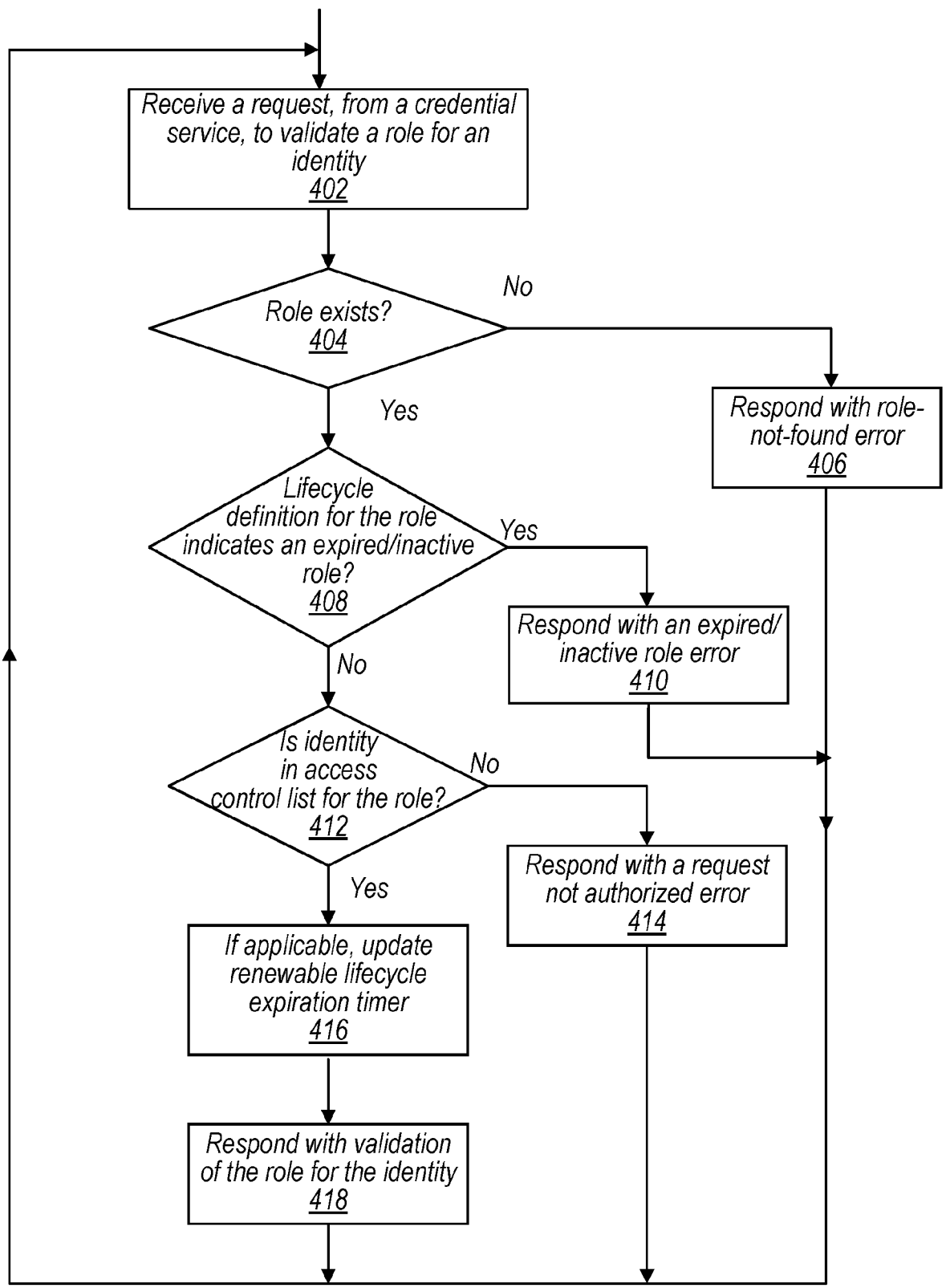
FIG. 4 is a process flow diagram for processing requests from a credential service to validate a role for an identity in a system that implements managed lifecycle roles for secure credential vending, according to at least some embodiments.

FIG. 4 is a process flow diagram for processing requests from a credential service to validate a role for an identity in a system that implements managed lifecycle roles for secure credential vending, according to at least some embodiments.

The functionality in FIG. 4 may correspond to ("3") in FIG. 1, and may be performed by the role lifecycle manager 118, in embodiments.

At block 402, a request from a credential service to validate a role for an identity is received (e.g., received by role manager 110). At block 404, a determination is made whether the role exists. For example, a managed lifecycle role may have been deleted automatically, or manually deleted, or may have never existed, etc. If the role does not exist, the role lifecycle manager 118 may respond with a role-not-found error (block 406). If the role does exist (block 404, yes) a determination is made whether the lifecycle definition for the role indicates an expired or inactive role (block 408). If so (block 408, yes) the role lifecycle manager 118 may respond with an expired or inactive role manager error message.

Otherwise (block 408, no) the role manager may determine whether an identity is in the access control list for the role (block 412). If not, (block 412, no) the role manager may respond with an error message indicating that the identity is not authorized (block 414). Otherwise, (block 412, yes) the role manager may respond to the request with validation of the role for the identity (block 418). For example, the role manager may respond with a validation token. In some embodiments, the role lifecycle manager may update a renewable lifecycle expiration timer (block 416) prior to or after, responding with the validation. Such a step is not necessary and may not be implemented in all systems.

The process may repeat, for additional requests. In some embodiments, logic implemented by the role manager may perform the authorization based on the access control list prior to performing the determination based on the lifecycle definition. In some embodiments, the system may perform both determinations, even though one or both of the determinations have failed. For instance, the role manager may return reasons for finding the request not authorized, sometimes including indications of failure for both the authorization as well as expiration.

It is not necessary that all of the illustrated functionality be carried out in FIG. 4. In some embodiments, the role manager may receive requests from a credential service to validate roles for identities (block 402), and for individual requests of the received requests for respective roles: determine, based on a current state of the role access information and of the one or more role attributes for the respective role according to the stored role lifecycle definition for the respective role, whether the respective identity is allowed to use the respective role (block 412) and respond to the individual request with an indication of whether the identity is allowed to use the respective role (418).

FIG. 5 is a process flow diagram for a role lifecycle sweep process in a system that implements managed lifecycle roles for secure credential vending, according to at least some embodiments. In some embodiments, the illustrated process runs as a sweep process for automated management of role lifecycles (e.g., deleting, or marking deleted, roles that have expired) and for managing other features associated with a role, such as role attributes defined in a role definition or otherwise (e.g., permission attributes, access control list attributes (ACL), or tags, etc.). The illustrated process may run asynchronously to the process illustrated in FIG. 4, described above. The process illustrated in FIG. 5 may be performed by the role lifecycle manager 118, in embodiments. The process may run continuously as a background task, may run based on a timer, or some background task may trigger it, or the like, etc.

In some embodiments, a trigger to scan lifecycle definitions for roles is received. The process may be triggered automatically, but a timer or the like, or may be triggered based on an event, such as a quantity of the roles reaching some maximum threshold, or based on a manual request for the process, or based on a request to generate a new role, etc., in embodiments.

At block 502, a role definition in the role data store is accessed. The lifecycle definition for that role definition is examined (block 504). A determination is made whether to modify, based on the lifecycle definition for the role, role attributes such as one or more permissions, an access control list (ACL) or to one or more tags (block 505). In embodiments, a role manager may manage roles according to respective role lifecycle definitions stored in data store 112. In embodiments, to manage the roles according to the role lifecycle definitions, the role manager may change, over time and based on the role lifecycle definitions, the role access information or one or more role attributes for at least some of the roles. For example, the state of permissions may be modified (permissions increased or decreased or changed to a different resource, etc.) over the lifecycle of the role, according to the lifecycle definition. In another example, roles are tagged with green or blue tags, indicating a team membership. Permissions may be changed, based on the team color. For example, roles with green tags may have permissions changed to access additional or different resources as a team project progresses over time (e.g., as time-based milestones are reached) and roles marked with green tags may be subject to other permission changes, over time, in another example.

If modifications are to be made (block 505, yes) the modifications to the role attributes (e.g., changes of state of permissions, access control list (ACL) or tags, etc.) are performed by the role lifecycle manager 118, for example (block 507).

A determination is made, based on the role definition, whether the role is expired (block 506). For an expired role, the role is deleted or marked as expired (block 508). Otherwise (block 506, no) the role lifecycle manager 118 determines if there is a next role (block 510). If not, the scan cycle is complete (block 512). Otherwise, the process may repeat until all of the roles have been scanned.

Figure 6:
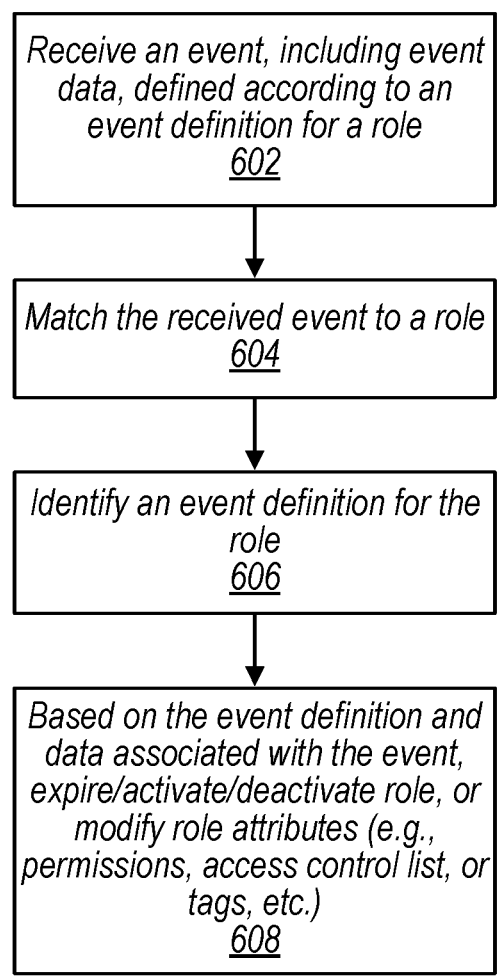
FIG. 6 is a data flow diagram for role lifecycle event processing in a system that implements managed lifecycle roles for secure credential vending, according to at least some embodiments.

FIG. 6 is a data flow diagram for role lifecycle event processing in a system that implements managed lifecycle roles for secure credential vending, according to at least some embodiments. The illustrated process may be performed by event handler 119, in embodiments. In some embodiments the process may be performed, based at least in part, on event definition information received during a role creation process such as that illustrated in FIG. 3, describe above.

At block 602, an event, including event data, is defined according to an event definition for a role. An event definition may include a source of the event (e.g., where or how to register a listener for the event) may describe what the event is, and may describe what causes the event and what the event causes to happen. The event may be an external-to-the-role-manager event (e.g., an event at an entity 102 or resource 130) or an internal-to-the-role-manager event (e.g., a time-based or non-time based event). The received event is matched to a role (block 604). For example, data in a received event message, in combination with event registration information may be used to identify a role associated with the event. An event definition for the role may be identified (block 606). Based on the event definition and data associated with the event, the role may be expired, activated, deactivated, or role attributes (permissions, access control list, or tags, etc.) may be modified (block 608) as a non-exhaustive list of examples.

FIG. 7 is a system architecture for a service provider system that implements managed lifecycle roles for secure credential vending, in at least some embodiments. Illustrated are various components similar to those FIG. 1, illustrated in within the context of a service provider network 700 (e.g., a cloud-based service provider). Various of the functionality depicted in FIGS. 2-6 may be performed by the role manager service 110 in FIG. 7. In particular, role manager service 110 and credential service 120 are illustrated as part of a service provider network 700, along with other services of the service provider network. Other services of the service provider network include a database service 710, storage service(s) 720, other service(s) 730, compute service(s) 740 and internal clients 108 (e.g., client applications or processes running on the service provider network that make calls on the other services, or the like). Also illustrated are external clients 108 and corresponding client networks 760 as well as external resources 130, similar to the resources illustrated in FIG. 1, described above, but external to the service provider network 700.

In embodiments, the services of the service provider network (e.g., services 710-740) clients 108, and/or external resources 130 may be the resources 130 illustrated in FIG. 1 and/or such entities could host the entities 102 that are trying to use the roles.

Illustrative System

Figure 8:
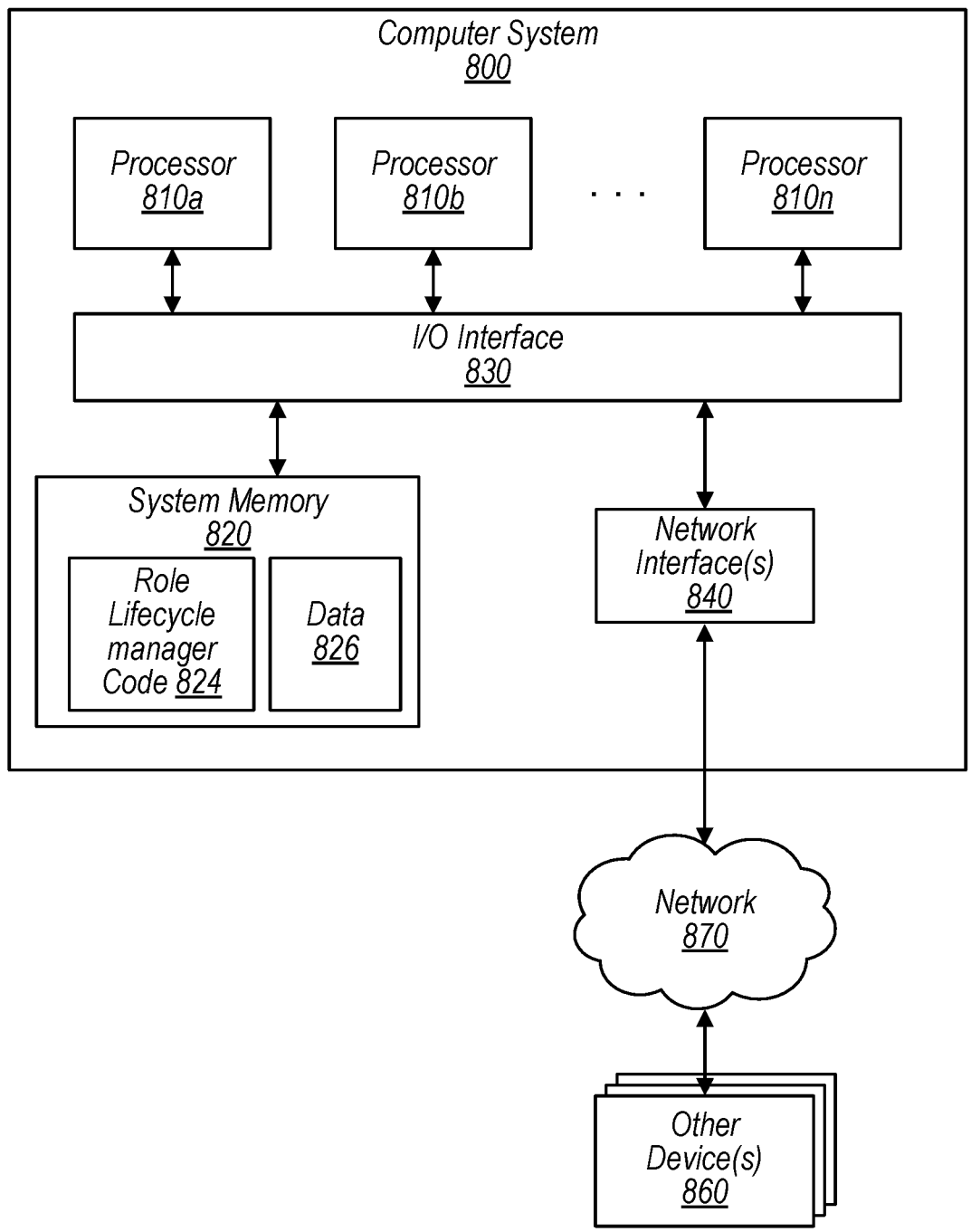
FIG. 8 is a block diagram illustrating an example computer system that may be used in some embodiments of a system that implements managed lifecycle roles for secure credential vending.

FIG. 8 is a block diagram illustrating an example computer system that may be used in some embodiments of a system that implements managed lifecycle roles for secure credential vending. In at least some embodiments, a request router that implements a portion or all of the managed lifecycle roles for secure credential vending methods and apparatus as described herein may include a general-purpose computer system that includes or is configured to access one or more computer-accessible media, such as computer system 800 illustrated in FIG. 8. Entities and resources may also be implemented by the example computer system, in embodiments.

In the illustrated embodiment, computer system 800 includes one or more processors 810 coupled to a system memory 820 via an input/output (I/O) interface 830. Computer system 800 further includes a network interface 840 coupled to I/O interface 830.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor(s) 1210. In various embodiments, system memory 820 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for managed lifecycle roles for secure credential vending, are shown stored within system memory 820 as code 824 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 870, such as other computer systems or devices as illustrated in FIGS. 1 and 7, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks such as Fibre Channel SANs, or via any other suitable type of network and/or protocol.

In some embodiments, system memory 820 may be one embodiment of a computer-accessible medium configured to store program instructions and data as described above for FIGS. 1 through 7 for implementing embodiments of network devices such as entities or resources. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Embodiments of the disclosure can be described in view of the following clauses.

Clause 1. A system, comprising: one or more data stores for storing access information and role definitions for a plurality of roles, wherein role definitions for some roles include role lifecycle definitions; one or more computers configured to implement a role manager configured to: manage a plurality of roles, at least some of which have role lifecycle definitions stored in the one or more data stores, wherein manage comprises determine, based on the role lifecycle definitions, expired roles; receive requests from a credential service to validate roles for entities; and for individual requests of one or more of the received requests: determine, based on respective stored role lifecycle definitions, that the corresponding role is expired; and respond to the individual request with an indication of the invalidity of the role determined to be expired.

Alternative Clause 1. A system, comprising: one or more data stores for storing role access information and role definitions for a plurality of roles, wherein role definitions for at least some of the roles include one or more role attributes and role lifecycle definitions; one or more computers configured to implement a role manager configured to: manage the plurality of roles according to the role lifecycle definitions stored in the one or more data stores, wherein to manage according to the role lifecycle definitions the role manager is configured to change, over time and based on the role lifecycle definitions, the role access information or one or more role attributes for the at least some of the roles; receive requests from a credential service to validate roles for identities, and for individual requests of the received requests for respective roles: determine, based on a current state of the role access information and of the one or more role attributes for the respective role according to the stored role lifecycle definition for the respective role, whether the respective identity is allowed to use the respective role; and respond to the individual request with an indication of whether the identity is allowed to use the respective role.

Clause 2. The system of clause 1, wherein the role manager is further configured to: receive a request to list roles for an account; access a role table with role definitions for an identity associated with the request; determine, based on lifecycle definitions in the role data store, which roles are expired; and present role information for the account, including indications of which roles are expired.

Clause 3. The system of clauses 1 to 2, wherein the role manager is further configured to perform: receiving, via a role lifecycle management interface, a request to modify a lifecycle definition for a particular one of the roles; obtaining a lifecycle definition for the particular role; and storing, based on determining that the modification is valid, the modification to the lifecycle definition for the particular role to at least one of the data stores.

Clause 4. The system of clauses 1 to 3, wherein the role manager is further configured to perform, for individual roles of the roles: accessing, for the individual role, a role definition in the role data store; examining the lifecycle definition for the role definition; determining that the individual role is expired; and deleting or marking expired, the individual role.

Clause 5. A computer-implemented method, comprising: receiving a plurality of requests via an interface for management of roles, at least some of which have lifecycle definitions stored in a role data store, wherein the interface provides for management of the roles and unexpired roles are useable to obtain one or more credentials to access one or more resources of a system; storing, for individual ones of the requests that request creation of a managed lifecycle role, a role lifecycle definition to the role data store, wherein when the role expires according to the lifecycle definition, the role is no longer useable to obtain one or more credentials to access one or more resources of the system; and storing, for individual ones of the requests that request creation of a static role, a definition of the role to the role data store without a lifecycle definition such that the static role is not associated with an expiration.

Alternative clause 5. A computer-implemented method, comprising: receiving a plurality of requests via an interface for management of roles, at least some of which have role access information and role definitions that include one or more attributes and lifecycle definitions stored in one or more data stores, wherein the interface provides for management of the roles, and wherein for at least some of the roles, a current state of the role access information and of the one or more attributes for respective roles are useable to determine whether a requesting identity is allowed to obtain one or more credentials to access one or more resources of a system; storing, for individual ones of the requests that request creation of a static role, a definition of the static role to the one or more data stores without a lifecycle definition for the static role, such that the role access information or the one or more attributes of the static role is not changed, in accordance with a lifecycle definition, over time; and storing, for individual ones of the requests that request creation of a managed lifecycle role, a role definition that includes one or more attributes and a lifecycle definition to the one or more data stores, wherein the role access information or the one or more attributes for the individual ones of the managed lifecycle roles is changed over time by a role manager, based on the respective lifecycle definition, and wherein a current state of the role access information and of the one or more attributes for respective managed lifecycle roles is useable to determine whether a requesting identity is allowed to obtain one or more credentials to access one or more resources of the system.

Clause 6. The method of clause 5, further comprising: prior to said storing the definition of the role to the data store without the lifecycle definition: determining that a quantity of roles has reached a threshold role maximum; executing a role lifecycle definition sweep process to identify roles to be expired; and deleting the roles identified for expiration to reduce the quantity of roles to below the threshold role maximum.

Clause 7. The method of clauses 5 to 6, further comprising: receiving, by a role manager, a request to list roles for an account; accessing, by the role manager, a role table with role definitions for an identity associated with the request; determining, by the role manager, based on lifecycle definitions in the role data store, which roles are expired; and responding to the request with role information for the account, including indications of which roles are expired.

Clause 8. The method of clauses 5 to 7, further comprising: receiving, via a role lifecycle management interface of the role manager, a request to modify a lifecycle definition for a particular one of the roles; obtaining, by the role manager, a lifecycle definition for the particular role; and storing, based on determining, the role manager, that the modification is valid, the modification to the lifecycle definition for the particular role to at least one of the data stores.

Clause 9. The method of clauses 5 to 8, further comprising: receiving a request, from a credential service, to validate a particular one of the roles for an identity; determining that a lifecycle definition for the particular role indicates an unexpired or active role; determining that the identity is in an access control list for the particular role; and responding, to the credential service, with validation of the particular role for identity.

Clause 10. The method of clause 9, further comprising: updating, based on the use of the particular role in the request from the credential service, a renewable lifecycle expiration timer for the particular role, wherein the renewable lifecycle expiration timer will cause the particular role to expire if the particular role goes without use for a period of time specified for the renewable lifecycle expiration timer.

Clause 11. The method of clauses 5 to 10, further comprising: performing, by a role lifecycle manager: for individual roles of the roles: accessing, for the individual role, a role definition in the role data store; examining the lifecycle definition for the role definition; determining that the individual role is expired; and deleting or marking expired, the individual role.

Clause 12. The method of clauses 5 to 10, further comprising: receiving, by an event handler, an event including event data, the event defined according to an event definition for a particular role of the roles; matching the received event to the particular role; identifying an event definition for the particular role; performing, based on the event definition and data associated with the event, at least one of: expiring the particular role, activating the particular role, deactivating the particular role, modifying permissions associated with the particular role, or modifying an access control list associated with the particular role.

Clause 13. One or more non-transitory computer readable storage media storing program instructions that are executable by one or more processors to implement a role manager configured to: manage a plurality of roles, at least some of which have lifecycle definitions stored in a role lifecycle definition data store; receive a request from a credential service to validate a role for an identity; determine whether the identity is authorized for the role; determine whether, based on a stored lifecycle definition for the role, the role is expired or inactive; and respond to the request with denial of use of the role if either the identity is not authorized or the role is expired or inactive.

Alternative clause 13. One or more non-transitory computer readable storage media storing program instructions that are executable by one or more processors to implement a role manager configured to: manage a plurality of roles according to lifecycle definitions stored in one or more data stores, wherein at least some of the roles have role access information and role definitions that include one or more attributes and lifecycle definitions stored in the one or more data stores, wherein to manage according to the lifecycle definitions the role manager is configured to change, over time and based on the lifecycle definitions, the role access information or one or more attributes for the at least some of the roles; receive a request from a credential service to validate a role for an identity; determine, based on a current state of the role access information and of the one or more attributes for the role according to the stored lifecycle definition for the role, whether the identity is authorized to use the respective role; respond to the request with an indication of whether the identity is authorized to use the role.

Clause 14. The non-transitory media of clause 13, wherein the role manager is further configured to perform: for individual roles of the roles: accessing, for the individual role, a role definition in a role data store; examining the lifecycle definition for the role definition; and determining that the individual role is expired; and deleting or marking expired, the individual role.

Clause 15. The non-transitory media of clauses 13 to 14, wherein the role manager is further configured to perform: updating, based on the use of the role in the request from the credential service, a renewable lifecycle expiration timer for the role, wherein the renewable lifecycle expiration timer will cause the role to expire if the role goes without use for a period of time specified for the renewable lifecycle expiration timer.

Clause 16. The non-transitory media of clauses 13 to 15, wherein the role manager is further configured to perform: receiving a request to list roles for an account; accessing a role table with role definitions for the identity associated with the request; determining, based on lifecycle definitions in a role data store, which roles are expired; and responding to the request with role information for the account, including indications of which roles are expired.

Clause 17. The non-transitory media of clauses 13 to 16, wherein the role manager is further configured to perform: receiving, via a role lifecycle management interface of the role manager, a request to modify a lifecycle definition for a particular one of the roles; obtaining a lifecycle definition for the particular role; and storing, based on determining that the modification is valid, the modification to the lifecycle definition for the particular role to at least one of the data stores.

Clause 18. The non-transitory media of clauses 13 to 17, wherein the role manager is further configured to perform: in response to receipt, via a role lifecycle management interface of the role manager, of a request to transition a static role to a lifecycle managed role: obtaining a lifecycle definition for the static role transition; and storing the lifecycle definition for the transitioned role to a role data store to transition the static role to a lifecycle managed role.

Clause 19. The non-transitory media of clauses 13 to 18, wherein the role manager is further configured to perform: in response to receipt, via a role lifecycle management interface of the role manager, of a request to transition a lifecycle managed role to a static role, deleting the lifecycle definition for the role.

Clause 20. The non-transitory media of clauses 13 to 19, wherein the role manager is further configured to perform: receiving a request to delete a lifecycle managed role; and deleting the role definition, comprising the lifecycle definition for the role, from a role data store.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software (e.g., computer-readable program instructions), hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more data stores for storing role access information and role definitions for a plurality of roles, wherein role definitions for at least some of the roles include one or more role attributes and role lifecycle definitions that pertain to existence of roles;
one or more computers configured to implement a role manager configured to:
manage the plurality of roles according to the role lifecycle definitions stored in the one or more data stores, wherein to manage according to the role lifecycle definitions the role manager is configured to change, over time and based on the role lifecycle definitions, the role access information or one or more role attributes for the at least some of the roles;
receive requests from a credential service to validate roles for identities, and for individual requests of the received requests for respective roles:
determine, based on a current state of the role access information and of the one or more role attributes for the respective role according to the stored role lifecycle definition for the respective role, whether the respective identity is allowed to use the respective role; and
respond to the individual request with an indication of whether the identity is allowed to use the respective role.

2. The system of claim 1, wherein the role manager is further configured to:
receive a request to list roles for an account;
access a role table with role definitions for an identity associated with the request;
determine, based on role lifecycle definitions in at least one of the data stores, which roles are expired; and
present role information for the account, including indications of which roles are expired.

3. The system of claim 1, wherein the role manager is further configured to:
receive, via a role lifecycle management interface, a request to modify a role lifecycle definition for a particular one of the roles;
obtain a role lifecycle definition for the particular role; and
store, based on determining that the modification is valid, the modification to the role lifecycle definition for the particular role to at least one of the data stores.

4. The system of claim 1, wherein the role manager is further configured to, for individual roles of the roles:
access, for the individual role, a role definition in at least one of the data stores;
examine the role lifecycle definition for the role definition;
determine that the individual role is expired; and
delete or mark expired, the individual role.

5. A computer-implemented method, comprising:
receiving a plurality of requests via an interface for management of roles, at least some of which have role access information and role definitions that include one or more attributes and lifecycle definitions stored in one or more data stores, wherein the interface provides for management of the roles, and wherein for at least some of the roles, a current state of the role access information and of the one or more attributes for respective roles are useable to determine whether a requesting identity is allowed to obtain one or more credentials to access one or more resources of a system;
storing, for individual ones of the requests that request creation of a static role, a definition of the static role to the one or more data stores without a lifecycle definition for the static role, such that the role access information or the one or more attributes of the static role is not changed, in accordance with a lifecycle definition, over time; and storing, for individual ones of the requests that request creation of a managed lifecycle role, a role definition that includes one or more attributes and a lifecycle definition to the one or more data stores, wherein the role access information or the one or more attributes for respective managed lifecycle roles is changed over time by a role manager, based on the respective lifecycle definition, and wherein a current state of the role access information and of the one or more attributes for the respective managed lifecycle roles is useable to determine whether a requesting identity is allowed to obtain one or more credentials to access one or more resources of the system.

6. The method of claim 5, further comprising:
prior to said storing the definition of the role to the data store without the lifecycle definition:
   determining that a quantity of roles has reached a threshold role maximum;
   executing a role lifecycle definition sweep process to identify roles to be expired; and
   deleting the roles identified for expiration to reduce the quantity of roles to below the threshold role maximum.

7. The method of claim 5, further comprising:
receiving, by a role manager, a request to list roles for an account;
accessing, by the role manager, a role table with role definitions for an identity associated with the request;
determining, by the role manager, based on lifecycle definitions in at least one of the data store, which roles are expired; and
responding to the request with role information for the account, including indications of which roles are expired.

8. The method of claim 5, further comprising:
receiving, via a role lifecycle management interface of the role manager, a request to modify a lifecycle definition for a particular one of the roles;
obtaining, by the role manager, a lifecycle definition for the particular role; and
storing, based on determining, the role manager, that the modification is valid, the modification to the lifecycle definition for the particular role to at least one of the data stores.

9. The method of claim 5, further comprising:
receiving a request, from a credential service, to validate a particular one of the roles for an identity;
determining that a lifecycle definition for the particular role indicates an unexpired or active role;
determining that the identity is in an access control list for the particular role; and
responding, to the credential service, with validation of the particular role for identity.

10. The method of claim 9, further comprising:
updating, based on the use of the particular role in the request from the credential service, a renewable lifecycle expiration timer for the particular role, wherein the renewable lifecycle expiration timer will cause the particular role to expire if the particular role goes without use for a period of time specified for the renewable lifecycle expiration timer.

11. The method of claim 5, further comprising:
performing, by a role lifecycle manager:
   for individual lifecycle managed roles of the lifecycle managed roles:
      accessing, for the individual lifecycle managed role, a role definition in at least one of the data stores;
      examining the lifecycle definition for the role definition; and
      modifying access information or the one or more attributes for the individual lifecycle managed role as specified in the respective role definition.

12. The method of claim 5, further comprising:
receiving, by an event handler, an event including event data, the event defined according to an event definition for a particular role of the roles;
matching the received event to the particular role;
identifying an event definition for the particular role; and
performing, based on the event definition and data associated with the event, at least one of:
   expiring the particular role,
   activating the particular role,
   deactivating the particular role,
   modifying permissions associated with the particular role, or
   modifying an access control list associated with the particular role.

13. One or more non-transitory computer readable storage media storing program instructions that are executable by one or more processors to implement a role manager configured to:
manage a plurality of roles according to lifecycle definitions stored in one or more data stores, wherein at least some of the roles have role access information and role definitions that include one or more attributes and lifecycle definitions, pertaining to existence of roles, stored in the one or more data stores, wherein to manage according to the lifecycle definitions the role manager is configured to change, over time and based on the lifecycle definitions, the role access information or one or more attributes for the at least some of the roles;
receive a request from a credential service to validate a role for an identity;
determine, based on a current state of the role access information and of the one or more attributes for the role according to the stored lifecycle definition for the role, whether the identity is authorized to use the respective role; and
respond to the request with an indication of whether the identity is authorized to use the role.

14. The non-transitory media of claim 13, wherein the role manager is further configured to perform:
for individual roles of the roles:
   accessing, for the individual role, a role definition in a role data store;
   examining the lifecycle definition for the role definition;
   determining that the individual role is expired; and
   deleting or marking expired, the individual role.

15. The non-transitory media of claim 13, wherein the role manager is further configured to perform:
updating, based on the use of the role in the request from the credential service, a renewable lifecycle expiration timer for the role, wherein the renewable lifecycle expiration timer will cause the role to expire if the role goes without use for a period of time specified for the renewable lifecycle expiration timer.

16. The non-transitory media of claim 13, wherein the role manager is further configured to perform:
receiving a request to list roles for an account;
accessing a role table with role definitions for the identity associated with the request;
determining, based on lifecycle definitions in a role data store, which roles are expired; and responding to the request with role information for the account, including indications of which roles are expired.

17. The non-transitory media of claim 13, wherein the role manager is further configured to perform:
   receiving, via a role lifecycle management interface of the role manager, a request to modify a lifecycle definition for a particular one of the roles;
   obtaining a lifecycle definition for the particular role; and
   storing, based on determining that the modification is valid, the modification to the lifecycle definition for the particular role to at least one of the data stores.

18. The non-transitory media of claim 13, wherein the role manager is further configured to perform:
   in response to receipt, via a role lifecycle management interface of the role manager, of a request to transition a static role to a lifecycle managed role:
      obtaining a lifecycle definition for the static role transition; and
      storing the lifecycle definition for the transitioned role to a role data store to transition the static role to a lifecycle managed role.

19. The non-transitory media of claim 13, wherein the role manager is further configured to perform:
   in response to receipt, via a role lifecycle management interface of the role manager, of a request to transition a lifecycle managed role to a static role, deleting the lifecycle definition for the role.

20. The non-transitory media of claim 13, wherein the role manager is further configured to perform:
   receiving a request to delete a lifecycle managed role; and
   deleting the role definition, comprising the lifecycle definition for the role, from a role data store.

* * * * *